United States Patent
Sugawara (10) Patent No.: US 10,865,286 B2
(45) Date of Patent: Dec. 15, 2020

(54) METHOD FOR MANUFACTURING POROUS MEMBRANE

(71) Applicant: Tokyo Ohka Kogyo Co., Ltd., Kanagawa (JP)

(72) Inventor: Tsukasa Sugawara, Kanagawa (JP)

(73) Assignee: TOKYO OHKA KOGYO CO., LTD., Kanagawa (JP)

(*) Notice: Subject to any disclaimer, the term of this patent is extended or adjusted under 35 U.S.C. 154(b) by 95 days.

(21) Appl. No.: 15/756,771

(22) PCT Filed: Aug. 31, 2016

(86) PCT No.: PCT/JP2016/075570
§ 371 (c)(1),
(2) Date: Mar. 1, 2018

(87) PCT Pub. No.: WO2017/038897
PCT Pub. Date: Mar. 9, 2017

(65) Prior Publication Data
US 2018/0244887 A1  Aug. 30, 2018

(30) Foreign Application Priority Data

Sep. 4, 2015 (JP) .................. 2015-174530
Jan. 14, 2016 (JP) .................. 2016-005548

(51) Int. Cl.
| | | |
|---|---|---|
| *C08J 9/26* | (2006.01) | |
| *C08J 5/18* | (2006.01) | |
| *C08J 3/215* | (2006.01) | |
| *C08J 3/21* | (2006.01) | |
| *B29C 41/02* | (2006.01) | |
| *B29C 41/46* | (2006.01) | |
| *C08J 9/36* | (2006.01) | |
| *B29L 7/00* | (2006.01) | |

(52) U.S. Cl.
CPC ............ *C08J 9/26* (2013.01); *B29C 41/02* (2013.01); *B29C 41/46* (2013.01); *C08J 3/212* (2013.01); *C08J 3/215* (2013.01); *C08J 5/18* (2013.01); *C08J 9/365* (2013.01); *B29L 2007/008* (2013.01); *C08J 2201/044* (2013.01); *C08J 2367/02* (2013.01); *C08J 2377/00* (2013.01); *C08J 2379/08* (2013.01); *C08J 2381/06* (2013.01); *C08J 2477/00* (2013.01); *C08J 2479/08* (2013.01)

(58) Field of Classification Search
CPC ........ C08J 9/26; C08J 9/365; C08J 2201/044; C08J 2367/02; C08J 2377/00; C08J 2379/08; C08J 2477/00; C08J 2479/08; B29C 41/02; B29C 41/46; B29L 2007/008
USPC .................................................. 264/328.18
See application file for complete search history.

(56) References Cited

U.S. PATENT DOCUMENTS

| | | |
|---|---|---|
| 2010/0303520 A1 | 12/2010 | Miyauchi et al. |
| 2011/0091774 A1 | 4/2011 | Wakizaka et al. |
| 2013/0273421 A1 | 10/2013 | Matsumura et al. |
| 2014/0329130 A1 | 11/2014 | Kanamura et al. |
| 2016/0185932 A1 | 6/2016 | Sugawara |

FOREIGN PATENT DOCUMENTS

| | | | |
|---|---|---|---|
| CN | 102417604 | | 4/2012 |
| JP | 7-331070 | | 12/1995 |
| JP | 11-21369 | | 1/1999 |
| JP | H1121369 A | * | 11/1999 |
| JP | 2001-106797 | | 4/2001 |
| JP | 2004-317530 | | 11/2004 |
| JP | 2005-146243 | | 6/2005 |
| JP | 2005-281386 | | 10/2005 |
| JP | 2008-36626 | | 2/2008 |
| JP | 2008036626 A | * | 2/2008 |
| JP | 2009-167369 | | 7/2009 |
| JP | 2009167369 A | * | 7/2009 |
| JP | 2010-24385 | | 2/2010 |
| JP | 2014-150035 | | 8/2014 |
| JP | 5605566 | | 10/2014 |
| JP | 2015-052107 | | 3/2015 |
| WO | 2009/123168 | | 10/2009 |
| WO | 2010/137728 | | 12/2010 |
| WO | 2012/046843 | | 4/2012 |

(Continued)

OTHER PUBLICATIONS

JP 2009-167369A machine translation JP to ENG (Year: 2009).*
JP H11-21369A machine translation JP to ENG (Year: 1999).*
JP 2008-036626A machine translation JP to ENG (Year: 2008).*
Kumar et al., "Shear-Force-Dominated Dual-Drive Planetary Ball Milling for the Scalable Production of Graphene and Its Electrocatalytic Application with Pd Nanostructures", RSC Adv., 2016, vol. 6, p. 20067-73. (Year: 2016).*
Notification of Reasons for Refusal dated Mar. 19, 2019 in Japanese Patent Application No. 2017-538086.

(Continued)

*Primary Examiner* — Joseph S Del Sole
*Assistant Examiner* — Lawrence D. Hohenbrink, Jr.
(74) *Attorney, Agent, or Firm* — Wenderoth, Lind & Ponack, L.L.P.

(57) ABSTRACT

To provide a method for manufacturing a polyimide and/or a polyamide imide porous membrane with which it is possible to prepare a varnish in which microparticles are satisfactorily dispersed, even when minute microparticles are used, and to manufacture a porous membrane using the varnish. The method for manufacturing a polyimide and/or a polyamide imide porous membrane comprises a step for preparing a porous membrane manufacturing composition containing microparticles and at least one resin component selected from the group consisting of polyamic acids, polyimides, polyamide imide precursors, polyamide imides, and polyethersulfones, the preparation step including a dispersion step for causing a slurry containing the microparticles to disperse by shear and compression or shock.

12 Claims, 4 Drawing Sheets

(56) References Cited

FOREIGN PATENT DOCUMENTS

| WO | 2013/084368 | 6/2013 |
| WO | 2015/020101 | 2/2015 |

OTHER PUBLICATIONS

International Search Report dated Nov. 29, 2016 in International (PCT) Application No. PCT/JP2016/075570.
Notification of Reasons for Refusal dated Oct. 23, 2019 in Japanese Patent Application No. 2017-538086.
Office Action dated Mar. 25, 2020 in Chinese Patent Application No. 201680051148.5.
Zheng Shuilin Yuan Zhuzu, "Non-Metallic Mining Processing Technology and Applied Manual", Metallurgical Industry Publishing Co., May 2005, 1st edition, pp. 59.

* cited by examiner

METHOD FOR MANUFACTURING POROUS MEMBRANE

TECHNICAL FIELD

The present invention relates to a method for manufacturing a porous film.

BACKGROUND ART

In recent years, polyimide and/or polyamide-imide porous film has been researched as a filter used for a separation film for a gas or liquid, or a separator for a lithium-ion battery, an electrolyte film for a fuel cell, or a low dielectric constant material.

Examples of the well-known method for manufacturing a polyimide porous film to be used as a separator include a method which includes applying a varnish containing silica particles dispersed in a polymer solution of polyamide acid and polyimide onto a substrate to form a coating film, then heating the coating film as necessary so as to obtain a polyimide film containing silica particles, and then removing silica in the polyimide film by elusion using a hydrogen fluoride solution so as to make the film porous (see Patent Document 1).

Patent Document 1: Japanese Patent No. 5605566

DISCLOSURE OF THE INVENTION

Problems to be Solved by the Invention

A particle-removing effect of a filter is generally determined depending on the sieving effect and the adsorption effect. In order to enhance the sieving effect and the adsorption effect with respect to a porous film, it is effective to make a pore diameter finer and to increase a specific surface area. Use of a varnish including fine particles whose particle diameter is small enables a porous film having an aperture of a smaller pore diameter and having a large specific surface area to be formed.

However, fine particles such as fine silica particles having an average particle diameter of, for example, about 200 nm easily cause aggregation in the above-mentioned varnish, thus making uniform dispersion difficult. The dispersibility of fine particles is improved to some extent by addition of a dispersant. However, the finer the fine particles are, the more limited the effect of the dispersant is. Therefore, it has been difficult to obtain a porous film in which micropores having a minute diameter (for example, about 200 nm) are uniformly formed.

The present invention has been made in view of the above-mentioned circumstances, and an object of the present invention is to provide a method for manufacturing a porous film in which even when minute fine particles are used, a varnish including satisfactorily dispersed fine particles is prepared, and a porous film can be manufactured by using the varnish.

Means for Solving the Problems

In order to solve the above-mentioned problems, the present inventors have conducted extensive studies. As a result, they have found that the above-mentioned problems can be solved by producing a varnish by a method including a dispersion step of dispersing slurry containing fine particles by a shearing force and a compression or impact force when the polyimide and/or polyamide-imide porous film are formed by using a varnish including at least one resin component selected from the group consisting of polyamide acid, polyimide, a polyamide-imide precursor, polyamide-imide and polyethersulfone, and fine particles, and they have completed the present invention.

A first aspect of the present invention relates to a method for manufacturing a porous film, the method including: a preparation step of preparing a composition for producing a porous film containing fine particles, and at least one resin component selected from the group consisting of polyamide acid, polyimide, a polyamide-imide precursor, polyamide-imide and polyethersulfone, wherein the preparing step includes a dispersion step of dispersing slurry containing fine particle by a shearing force and a compression or impact force.

A second aspect of the present invention is a method for manufacturing a composition for producing a porous film: the method including: a step of preparing slurry (1) containing fine particles and a solvent; a step of preparing a varnish (1) containing at least one resin component selected from the group consisting of polyamide acid, polyimide, a polyamide-imide precursor, polyamide-imide and polyethersulfone, and a solvent; a step of kneading the slurry (1) and the varnish (1) to prepare slurry (2), and a step of dispersing the slurry (2) by a shearing force and a compression or impact force.

Effects of the Invention

The present invention can provide a method for manufacturing a porous film, capable of manufacturing a porous film in which even when minute fine particles are used, a varnish in which fine particles are satisfactorily dispersed is prepared and then the varnish is used.

BRIEF DESCRIPTION OF THE DRAWINGS

FIG. 3 is a scanning electron microscope image showing a surface of a porous film obtained in Example 5.

FIG. 4 is a scanning electron microscope image showing a surface of a porous film obtained in Comparative Example 2.

PREFERRED MODE FOR CARRYING OUT THE INVENTION

Embodiments of the present invention will now be described in detail, but the present invention is not necessarily limited to the following embodiments and can be implemented with appropriate modifications within the purpose of the present invention.

«Method for Manufacturing Porous Film»

A method for manufacturing a porous film includes a dispersion step of dispersing slurry containing fine particle by a shearing force and a compression or impact force in a preparation step of preparing a composition for producing a porous film containing fine particles and a resin component (hereinafter, which may be simply referred to as a varnish). As the resin component, at least one or more selected from the group consisting of polyamide acid, polyimide, a polyamide-imide precursor, polyamide-imide and polyethersulfone is/are used. Hereinafter, a preparation step of a composition for producing a porous film will be described.

<Preparation Step of Composition for Producing Porous Film>

As mentioned above, a preparation step of a composition for producing a porous film includes a dispersion step of dispersing slurry containing fine particles by a shearing force and a compression or impact force. In the above-mentioned dispersion step, as a device for dispersing slurry by a shearing force and a compression force, for example, a high-shear dispersing device such as a three-roll mill is preferably used. As a device for dispersing fine particles in slurry by a shearing force and an impact force, a device such as a beads mill is preferably used. On the other hand, a device such as a planetary mixer is sufficient for dispersing fine particles having relatively large average diameter. However, since it carries out kneading only by a shearing force, it is not sufficient for dispersing fine particles having an average particle diameter of 200 nm or less. By dispersing fine particles in slurry by a shearing force and a compression or impact force, even when fine particles having a small average particle diameter are dispersed, the fine particles can be dispersed uniformly with reaggregation of the dispersed fine particles suppressed.

The average particle diameter of the fine particles is preferably 200 nm or less, and more preferably 160 nm or less. Use of fine particles having an average particle diameter of 200 nm or less makes it easy to form a porous film having micropore having a desired pore diameter and having an excellent particle removing effect. Note here that the size of a pore part derived from a fine particle formed in the porous film is the same as or similar to the average particle diameter of the fine particles. Therefore, from the viewpoint of permeation property and the like of fluid when a porous film is used as a filter, the average particle diameter of fine particles is preferably 5 nm or more and more preferably 10 nm or more. Furthermore, it is preferable that the fine particles have a high sphericity and a low particle diameter distribution index. Fine particles satisfying these conditions show excellent dispersibility in the varnish and can be used without causing aggregation with one another.

The content of fine particles in the slurry is, for example, 5 to 95% by mass, preferably 20 to 90% by mass, and more preferably 30 to 85% by mass with respect to the mass of the slurry. When the content of fine particles is in the above-mentioned range, a porous film is easily formed without easily causing aggregation of the fine particles in a varnish, and without causing cracking and the like on the surface. Thus, a porous film having excellent filter performance can be produced stably.

Next, a preparation step of a composition for producing a porous film will be described specifically.

First Embodiment

A preparation step of a composition for producing a porous film may include a step of preparing slurry (1) containing fine particles and a solvent; a step of preparing varnish (1) containing at least one resin component selected from the group consisting of polyamide acid, polyimide, a polyamide-imide precursor, polyamide-imide and polyethersulfone as well as a solvent; a step of kneading the slurry (1) and the varnish (1) to prepare slurry (2); and a step of dispersing the slurry (2) by a shearing force and a compression or impact force. When the slurry (2) is dispersed by a shearing force and a compression force, the solid content concentration of the slurry (2) is not particularly limited, but it is, for example, 10% by mass or more, preferably 30% by mass or more, and more preferably 40% by mass or more, and the upper limit is, for example, 60% by mass or less. When the slurry (2) is dispersed by a shearing force and an impact force, the solid content concentration of the slurry (2) is not particularly limited, but it is, for example, 1% by mass or more, preferably 5% by mass or more, and more preferably 10% by mass or more, and the upper limit is, for example, 60% by mass or less.

The above-mentioned preparation step may include a step of kneading the slurry (2) by a centrifugal force, for example, kneading by using a rotation-revolution type mixer as a pre-step before the step of dispersing the slurry (2) by a shearing force and a compression or impact force. Furthermore, the above-mentioned preparation step may include a step of kneading the slurry (2) only by a shearing force, for example, kneading by using a planetary mixer as a pre-step before the step of dispersing the slurry (2) by a shearing force and a compression or impact force.

Second Embodiment

A preparation step of a composition for producing a porous film may include a step of preparing slurry (1) containing fine particles and a solvent; a step of dispersing the slurry (1) by a shearing force and a compression or impact force; a step of preparing varnish (1) containing at least one resin component selected from the group consisting of polyamide acid, polyimide, a polyamide-imide precursor, polyamide-imide and polyethersulfone as well as a solvent; and a step of kneading the slurry (1) and the varnish (1) that have undergone the dispersion step. When the slurry (1) is dispersed by a shearing force and a compression force, the solid content concentration of the slurry (2) is not particularly limited, but it is, for example, 10% by mass or more, preferably 30% by mass or more, and more preferably 40% by mass or more, and the upper limit is, for example, 90% by mass or less. When the slurry (1) is dispersed by a shearing force and an impact force, the solid content concentration of the slurry (2) is not particularly limited, but it is, for example, 1% by mass or more, preferably 5% by mass or more, and more preferably 10% by mass or more, and the upper limit is, for example, 90% by mass or less.

The above-mentioned preparation step may include a step of dispersing the slurry (1) by an impact force, for example, dispersing using a homogenizer, as a pre-step before the step of dispersing the slurry (1) by a shearing force and a compression or impact force. The preparation step may include a step of kneading the slurry by a centrifugal force, for example, kneading the slurry (1) and the varnish (1) using a rotation-revolution type mixer, as a pre-step before the step of kneading the slurry (1) and the varnish (1) that have undergone the dispersion step. When the slurry (1) and the varnish (1) that have undergone the dispersion step are kneaded, reaggregation of fine particles easily occurs. Thus, the preparation step may include a step of dispersing by a shearing force and a compression or impact force again, as a post-step after the step of kneading the slurry (1) and the varnish (1) that have undergone the dispersion step.

Third Embodiment

A preparation step of a composition for producing a porous film may include, for example, a step of preparing slurry (3) containing fine particles, and at least one resin component selected from the group consisting of polyamide acid, polyimide, a polyamide-imide precursor, polyamide-imide and polyethersulfone, and dispersing the slurry (3) by a shearing force and a compression or impact force; and a viscosity adjusting step of adding a solvent into the slurry (3) that has undergone the dispersion step so as to reduce the viscosity of the slurry (3). In the viscosity adjusting step, the viscosity of the slurry (3) is adjusted to not more than 5 Pa·s. In the third embodiment, since the slurry (3) at the time of dispersion step is in a state in which the viscosity is high, for example, the viscosity is more than 5 Pa·s, it is considered that the fine particles are easily dispersed more efficiently by a shearing force and a compression or impact force. When the slurry (3) is dispersed by a shearing force and a compression force, the solid content concentration of the slurry (3) is not particularly limited, but it is, for example, not less than 10% by mass, preferably not less than 30% by mass, and more preferably not less than 40% by mass, and the upper limit is, for example, not more than 60% by mass. When the slurry (3) is dispersed by a shearing force and an impact force, the solid content concentration of the slurry (2) is not particularly limited, but it is, for example, not less than 1% by mass, preferably not less than 5% by mass, and more preferably not less than 10% by mass, and the upper limit is, for example, not more than 60% by mass.

<Composition for Producing Porous Film>

Hereinafter, essential or optional components of a varnish used in a preparation step of a composition for producing a porous film (varnish) will be described.

[Resin Component]

A varnish contains at least one selected from the group consisting of polyamide acid, polyimide, a polyamide-imide precursor, polyamide-imide and polyethersulfone as a resin component. Hereinafter, polyamide acid, polyimide, polyamide-imide and a polyamide-imide precursor, and polyethersulfone will be described sequentially.

[Polyamide Acid]

The polyamide acid may be any product prepared by polymerizing appropriate tetracarboxylic dianhydride and diamine, which can be used without particular limitation. The amounts of the tetracarboxylic dianhydride and the diamine to be used are not particularly limited, and the amount of the diamine is preferably 0.50 to 1.50 mol, more preferably 0.60 to 1.30 mol, and most preferably 0.70 to 1.20 mol, based on 1 mol of the tetracarboxylic dianhydride.

The tetracarboxylic dianhydride can be appropriately selected from tetracarboxylic dianhydrides that have been conventionally used as raw materials for synthesizing polyamide acids. The tetracarboxylic dianhydride may be an aromatic tetracarboxylic dianhydride or an aliphatic tetracarboxylic dianhydride, but from the viewpoint of the heat resistance of the resulting polyimide resin, an aromatic tetracarboxylic dianhydride is preferably used. One type of tetracarboxylic dianhydride may be used alone or in combination of two or more types thereof.

Preferred examples of the aromatic tetracarboxylic dianhydride include pyromellitic dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 3,3',4,4'-biphenyltetracarboxylic dianhydride, 2,3,3',4'-biphenyltetracarboxylic dianhydride, 2,2,6,6-biphenyltetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 3,3',4,4'-benzophenonetetracarboxylic dianhydride, bis(3,4-dicarboxyphenyl)ether dianhydride, bis(2,3-dicarboxyphenyl)ether dianhydride, 2,2',3,3'-benzophenonetetracarboxylic dianhydride, 4,4-(p-phenylenedioxy)diphthalic dianhydride, 4,4-(m-phenylenedioxy)diphthalic dianhydride, 1,2,5,6-naphthalenetetracarboxylic dianhydride, 1,4,5,8-naphthalenetetracarboxylic dianhydride, 2,3,6,7-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 9,9-bisphthalic anhydride fluorene, and 3,3',4,4'-diphenylsulfonetetracarboxylic dianhydride. Examples of the aliphatic tetracarboxylic dianhydride include ethylenetetracarboxylic dianhydride, butanetetracarboxylic dianhydride, cyclopentanetetracarboxylic dianhydride, cyclohexanetetracarboxylic dianhydride, 1,2,4,5-cyclohexanetetracarboxylic dianhydride, and 1,2,3,4-cyclohexanetetracarboxylic dianhydride. Among them, 3,3',4,4'-biphenyltetracarboxylic dianhydride and pyromellitic dianhydride are preferred because of their inexpensiveness, ready availability, etc. One type of tetracarboxylic dianhydride may be used alone or as a mixture of two or more thereof.

The diamine can be appropriately selected from diamines that have been conventionally used as raw materials for synthesizing polyamide acids. The diamine may be an aromatic diamine or an aliphatic diamine, but from the viewpoint of the heat resistance of the resulting polyimide resin, an aromatic diamine is preferred. One type of these diamines may be used alone or in combination of two or more types thereof.

Examples of the aromatic diamine include diamino compounds having one phenyl group or about two to ten phenyl groups. Specifically, examples of the aromatic diamine include phenylenediamines and their derivatives, diaminobiphenyl compounds and their derivatives, diaminodiphenyl compounds and their derivatives, diaminotriphenyl compounds and their derivatives, diaminonaphthalenes and their derivatives, aminophenylaminoindanes and their derivatives, diaminotetraphenyl compounds and their derivatives, diaminohexaphenyl compounds and their derivatives, and cardo-type fluorenediamine derivatives.

The phenylenediamines are, for example, m-phenylenediamine and p-phenylenediamine. The phenylenediamine derivatives are diamines to which alkyl groups, such as a methyl group or an ethyl group, are bound, such as 2,4-diaminotoluene and 2,4-triphenylenediamine.

In the diaminodiphenyl compounds, two aminophenyl groups are bonded to each other. For example, the diaminodiphenyl compounds are 4,4'-diaminobiphenyl and 4,4'-diamino-2,2'-bis(trifluoromethyl)biphenyl.

The diaminodiphenyl compound is a compound obtained by linkage of two aminophenyl groups at their phenyl groups via another group. The linkage is, for example, an ether linkage, a sulfonyl linkage, a thioether linkage, a linkage of an alkylene or its derivative group, an imino linkage, an azo linkage, a phosphine oxide linkage, an amide linkage, or an ureylene linkage. The number of carbon atoms of the alkylene linkage is about 1 to 6. The derivative group is an alkylene group whose one or more hydrogen atoms have been replaced by, for example, halogen atoms.

Examples of the diaminodiphenyl compounds include 3,3'-diaminodiphenyl ether, 3,4'-diaminodiphenyl ether, 4,4'-diaminodiphenyl ether, 3,3'-diaminodiphenyl sulfone, 4,4'-diaminodiphenyl sulfone, 4,4'-diaminodiphenyl sulfone, 3,3'-diaminodiphenyl methane, 3,4'-diaminodiphenyl methane, 4,4'-diaminodiphenyl methane, 4,4'-diaminodiphenyl sulfide, 3,3'-diaminodiphenyl ketone, 3,4'-diaminodiphenyl ketone, 2,2-bis(p-aminophenyl)propane, 2,2'-bis(p-aminophenyl)hexafluoropropane, 4-methyl-2,4-bis(p-aminophenyl)-1-pentene, 4-methyl-2,4-bis(p-aminophenyl)-2-pentene, iminodianiline, 4-methyl-2,4-bis(p-aminophenyl)pentane, bis(p-aminophenyl)phosphine oxide, 4,4'-diaminoazobenzene, 4,4'-diaminodiphenylurea, 4,4'-diaminodiphenylamide, 1,4-bis(4-aminophenoxy)benzene, 1,3-bis(4-aminophenoxy)benzene, 1,3-bis(3-aminophenoxy)benzene, 4,4'-bis(4-aminophenoxy)biphenyl, bis[4-(4-aminophenoxy)phenyl] sulfone, bis[4-(3-aminophenoxy)phenyl] sulfone, 2,2-bis[4-(4-aminophenoxy)phenyl]propane, and 2,2-bis[4-(4-aminophenoxy)phenyl]hexafluoropropane.

Among these, p-phenylenediamine, m-phenylenediamine, 2,4-diaminotoluene, and 4,4'-diaminodiphenylether are preferred because of their inexpensiveness, ready availability, etc.

The diaminotriphenyl compound is formed by linkage of two aminophenyl groups and one phenylene group, all of which are each linked through another group. The "another group" is selected from the same groups as in the diaminodiphenyl compounds. Examples of the diaminotriphenyl compounds include 1,3-bis(m-aminophenoxy)benzene, 1,3-bis(p-aminophenoxy)benzene, and 1,4-bis(p-aminophenoxy)benzene.

Examples of the diaminonaphthalenes include 1,5-diaminonaphthalene and 2,6-diaminonaphthalene.

Examples of the aminophenylaminoindanes include 5- or 6-amino-1-(p-aminophenyl)-1,3,3-trimethylindane.

Examples of the diaminotetraphenyl compounds include 4,4'-bis(p-aminophenoxy)biphenyl, 2,2'-bis[p-(p'-aminophenoxy)phenyl]propane, 2,2'-bis[p-(p'-aminophenoxy)biphenyl]propane, and 2,2'-bis[p-(m-aminophenoxy)phenyl]benzophenone.

An example of the cardo-type fluorenediamine derivatives is 9,9-bisanilinefluorene.

The number of carbon atoms of aliphatic diamine is, for example, about 2 to 15. Specific examples of aliphatic diamine include pentamethylenediamine, hexamethylenediamine, and heptamethylenediamine.

Note here that hydrogen atoms of these diamines may be a compound having at least one substituent selected from the group consisting of halogen atoms and methyl, methoxy, cyano, and phenyl groups.

There is no particular limitation to means for producing the polyamide acid, and, for example, well-known technique such as a method for reacting an acid and a diamine component in a solvent can be used.

The reaction of a tetracarboxylic dianhydride and a diamine is usually performed in a solvent. The solvent to be used for the reaction of a tetracarboxylic dianhydride and a diamine is not particularly limited and may be any solvents that can dissolve the tetracarboxylic dianhydride and the diamine without reacting with the tetracarboxylic dianhydride and the diamine. One type of solvent may be used alone or in combination of two or more types thereof Examples of the solvent to be used for the reaction of a tetracarboxylic dianhydride and a diamine include nitrogen-containing polar solvents, such as N-methyl-2-pyrrolidone, N,N-dimethyl acetamide, N,N-diethylacetamide, N,N-dimethylformamide, N,N-diethylformamide, N-methylcaprolactam, and N,N,N',N'-tetramethylurea; lactone polar solvents, such as β-propiolactone, γ-butyrolactone, γ-valerolactone, δ-valerolactone, γ-caprolactone, and ε-caprolactone; dimethyl sulfoxide; acetonitrile; fatty acid esters, such as ethyl lactate and butyl lactate; ethers, such as diethylene glycol dimethyl ether, diethylene glycol diethyl ether, dioxane, tetrahydrofuran, methyl cellosolve acetate, and ethyl cellosolve acetate; and phenol solvents, such as cresols and xylene-based solvent. One type of these solvents may be used alone or in combination of two or more types thereof. The amount of the solvent to be used is not particularly limited but is desirably such that the content of the resulting polyamide acid is 5% to 50% by mass.

Among these solvents, from the viewpoint of the solubility of the resulting polyamide acid, preferred are nitrogen-containing polar solvents, such as N-methyl-2-pyrrolidone, N,N-dimethyl acetamide, N,N-diethylacetamide, N,N-dimethylformamide, N,N-diethylformamide, N-methylcaprolactam, and N,N,N',N'-tetramethylurea.

The polymerization temperature is usually −10° C. to 120° C. and preferably 5° C. to 30° C. The polymerization time varies depending on the raw material composition to be used, and is usually 3 to 24 Hr (hours). One type of the polyamide acid may be used alone or in combination of two or more types thereof.

[Polyimide]

The polyimide can be any known polyimide, and used without any limitation to its structure and molecular weight. The side chain of the polyimide may have a condensable functional group, such as a carboxy group, or a functional group enhancing the cross-linking reaction, etc. during burning. Furthermore, when the composition for producing a porous film contains a solvent, polyimide that can be solved in a solvent used is preferable.

In order to make the polyimide soluble in a solvent, it is effective to use a monomer for introducing a flexible bend structure into the main chain, for example, to use an aliphatic diamine, such as ethylenediamine, hexamethylenediamine, 1,4-diaminocyclohexane, 1,3-diaminocyclohexane, or 4,4'-diaminodicyclohexylmethane; an aromatic diamine, such as 2-methyl-1,4-phenylenediamine, o-tolidine, m-tolidine, 3,3'-dimethoxybenzidine, or 4,4'-diaminobenzanilide; a polyoxyalkylenediamine, such as polyoxyethylenediamine, polyoxypropylenediamine, or polyoxybutyrenediamine; a polysiloxanediamine; 2,3,3',4'-oxydiphthalic anhydride, 3,4,3',4'-oxydiphthalic anhydride, or 2,2-bis(4-hydroxyphenyl)propanedibenzoate-3,3',4,4'-tetracarboxylic dianhydride. It is also effective to use a monomer containing a functional group for improving the solubility in a solvent, for example, to use a fluorinated diamine, such as 2,2'-bis(trifluoromethyl)-4,4'-diaminobiphenyl or 2-trifluoromethyl-1,4-phenylenediamine. Furthermore, in addition to the monomer for improving the solubility of the polyimide, a monomer that is mentioned in the paragraph describing the polyamide acid may be used within a range that does not inhibit the solubility. Each of polyimide and the monomer thereof may be used alone or may be used in combination of two or more types thereof.

There is no limitation to means for producing polyimide. Polyimide may be produced by any well-known techniques, for example, chemically imidizing or thermally imidizing polyamide acid. Examples of such polyimides include aliphatic polyimide (full-aliphatic polyimides) and aromatic polyimides, and aromatic polyimides are preferable. The aromatic polyimide may be one prepared by a thermal or chemical ring-closing reaction of a polyamide acid having repeating units represented by Formula (1) or a polyimide having repeating units represented by Formula (2). In the formulae, Ar represents an aryl group. When the composition for producing a porous film contains a solvent, these polyimides may be then solved in a solvent to be used.

[Formula 1]

[Formula 2]

[Polyamide-Imide and Polyamide-Imide Precursor]

Any well-known polyamide-imides can be used without limitation to the structure or molecular weight. The side chain of the polyamide-imide may have a condensable functional group, such as a carboxy group, or a functional group enhancing the cross-linking reaction, etc. during burning. Furthermore, when the composition for producing a porous film contains a solvent, a soluble polyamide-imide that can be solved in a solvent to be used is preferable.

As the polyamide-imide, (i) a resin obtained by reacting an acid having a carboxyl group and an acid anhydride group with diisocyanate in one molecule of trimellitic anhydride and the like, (ii) a resin obtained by imidization of a precursor polymer obtained by reacting a reactive derivative of the acid such as trimellitic anhydride chloride and diamine (a polyamide-imide precursor) can be usually used without particular limitation.

Examples of the above-mentioned acids or the reactive derivatives include trimellitic anhydride, trimellitic anhydride halides such as trimellitic anhydride chloride, trimellitic anhydride esters, and the like.

Examples of the above-mentioned optional diamine include diamines described as an example in the description of the above-mentioned polyamide acid. A diaminopyridine compound can also be used.

The above mentioned any diisocyanate is not particularly limited, and includes, for example, a diisocyanate compound corresponding to the above-mentioned optional diamine can be used. Specific examples thereof include meta-phenylene diisocyanate, p-phenylene diisocyanate, o-tolidine diisocyanate, p-phenylene diisocyanate, m-phenylene diisocyanate, 4,4'-oxybis (phenyl isocyanate), 4,4'-diphenylmethane diisocyanate, bis[4-(4-isocyanate phenoxy) phenyl] sulfone, 2,2'-bis[4-(4-isocyanate phenoxy) phenyl] propane, 2,4-tolylene diisocyanate, 2,6-tolylene diisocyanate, 4,4'-diphenylmethane diisocyanate, 3,3'-dimethyldiphenyl-4,4'-diisocyanate, 3,3'-diethyldiphenyl-4,4'-diisocyanate, isophorone diisocyanate, hexamethylene diisocyanate, 4,4'-dicyclohexyl methane diisocyanate, m-xylene diisocyanate, p-xylene diisocyanate, naphtalen diisocyanate, and the like, can be exemplified.

As a raw material monomer of polyamide-imide, in addition to the above, it is possible to use compounds described as general formulae in Japanese Unexamined Patent Application, Publication No. S63-283705 and Japanese Unexamined Patent Application, Publication No. H2-198619. Furthermore, the imidization in the method described in the above (ii) may be any one of thermal imidization and chemical imidization. As the chemical imidization, a method of immersing an unburned composite film formed by using a composition for producing a porous film such as a polyamide-imide precursor in a mixed solvent including acetic anhydride, or acetic anhydride and isoquinoline, and the like can be used. Note here that the polyamide-imide precursor can be referred to as a polyimide precursor from the viewpoint that it is a precursor before imidization.

The polyamide-imide to be contained in a varnish may be the above-mentioned (1) a polymer obtained by reacting an acid such as trimellitic anhydride and diisocyanate with each other, (2) a polymer obtained by imidization of a precursor polymer obtained by reacting a reactive derivative of the above-mentioned acid such as trimellitic anhydride and diamine with each other, or the like. The term "polyamide-imide precursor" in this specification and claims means a polymer before imidization (a precursor polymer". Each of polyamide-imide and polyamide-imide precursor may be used alone or in combination of two or more types thereof. Furthermore, as the polyamide-imide, each of the above-mentioned polymer, raw material monomer, and oligomer may be used alone or in combination of two or more types thereof.

[Polyethersulfone]

Polyethersulfone to be contained in a varnish can be appropriately selected depending on the use of porous film produced and it may be hydrophilic or hydrophobic. Furthermore, it may be aliphatic polyethersulfone or aromatic polyethersulfone. The mass average molecular weight is, for example, 5000 to 1,000,000, and preferably 10,000 to 300,000.

[Fine Particles]

The material of the fine particles is not particularly limited and may adopt any known material as long as the material is insoluble in the solvent contained in the varnish and can be removed later from resin-fine particle composite film. Examples of the inorganic material include metal oxides, such as silica (silicon dioxide), titanium oxide, and alumina ($Al_2O_3$). Examples of the organic materials include high-molecular-weight olefins (such as polypropylene and polyethylene) and organic polymer fine particles, such as polystyrenes, epoxy resins, celluloses, polyvinyl alcohols, polyvinyl butyrals, polyesters, and polyethers. The fine particles may be used alone or used in combination of two or more types thereof.

Specific examples of the fine particles include colloidal silica. In particular, it is preferable to select monodisperse spherical silica particles because uniform pores can be formed.

[Solvent]

As the solvent, those described as an example of the solvents used for reaction between tetracarboxylic dianhydride and diamine can be used without limitation as long as the solvents can solve the resin component contained in a varnish and does not solve the fine particles. Furthermore, examples of the solvent used for allowing a varnish to contain polyethersulfone include nitrogen-containing polar solvents such as N-methyl-2-pyrrolidone, N,N-dimethyl acetamide, N,N-diethylacetamide, N,N-dimethylformamide, N,N-diethylformamide, N-methylcaprolactam, and N,N,N',N'-tetramethylurea; polar solvents such as diphenylsulfone, dimethylsulfone, dimethylsulfoxide, benzophenone, tetrahydrothiophene-1,1-dioxide, and 1,3-dimethyl-2-imidazolidinone. The solvent may be used alone or in combination of two or more types thereof.

[Dispersant]

The varnish may further contain a dispersant in addition to the fine particles, in order to uniformly disperse the fine particles in the varnish. The addition of the dispersant allows further uniform mixing of the resin component with the fine particles, and, in addition, allows uniform dispersion of the fine particles in the molded or formed film. As a result, dense apertures are provided on the surface of the finally formed a porous film, and the front and rear surfaces can be efficiently communicated with each other so as to improve the air permeability of the porous film. Furthermore, addition of the dispersant easily improves drying of the varnish, and easily improves peelability of the formed unburned composite film from a substrate and the like.

The dispersant is not particularly limited and any known dispersant may be used. Examples of the dispersant include, but not limited to, anionic surfactants, such as salts of coconut fatty acid, salts of sulfonated castor oil, lauryl sulfate, polyoxyalkylene allylphenyl ether sulfate, alkylbenzenesulfonic acid, alkylbenzene sulfonate, alkyldiphenyl ether disulfonate, alkylnaphthalene sulfonate, dialkyl sulfosuccinate, isopropyl phosphate, polyoxyethylene alkyl ether phosphate, and polyoxyethylene allylphenyl ether phosphate; cationic surfactants, such as oleylamine acetate, lauryl pyridinium chloride, cetyl pyridinium chloride, lauryl trimethylammonium chloride, stearyl trimethylammonium chloride, behenyl trimethylammonium chloride, and didecyl dimethylammonium chloride; amphoteric surfactants, such as coconut alkyl dimethylamine oxide, fatty acid amide propyl dimethyl amine oxide, alkyl polyaminoethyl glycine hydrochloride, amide betaine surfactant, alanine surfactant, and lauryl iminodipropionic acid; polyoxyalkylene primary alkyl ether or polyoxyalkylene secondary alkyl ether nonionic surfactants, such as polyoxyethylene octyl ether, polyoxyethylene decyl ether, polyoxyethylene lauryl ether, polyoxyethylene laurylamine, polyoxyethylene oleylamine, polyoxyethylene polystyryl phenyl ether, and polyoxyalkylene polystyryl phenyl ether; other polyoxyalkylene nonionic surfactants, such as polyoxyethylene dilaurate, polyoxyethylene laurate, polyoxyethylenated castor oil, polyoxyethylenated hydrogenated castor oil, sorbitan laurate, polyoxyethylene sorbitan laurate, and fatty acid diethanolamide; fatty acid alkyl esters, such as octyl stearate and trimethylolpropane tridecanoate; and polyether polyols, such as polyoxyalkylene butyl ether, polyoxyalkylene oleyl ether, and trimethylol propane tris(polyoxyalkylene) ether. These dispersants may be used as a mixture of two or more thereof.

From the view point of, for example, the film formability, the content of the dispersant in the varnish is preferably 0.01 to 5% by mass, more preferably 0.05 to 1% by mass, and further more preferably 0.1 to 0.5% by mass, with respect to the fine particles.

<Method for Manufacturing Porous Film>

A method for manufacturing a porous film includes an unburned composite film forming step of forming an unburned composite film using the above-mentioned varnish; a burning step of burning the unburned composite film to obtain a resin-fine particle composite film; and a fine particle-removing step of removing the fine particles from the resin-fine particle composite film.

[Method for Producing Unburned Composite Film (Unburned Composite Film Forming Step)]

Hereinafter, a method for forming an unburned composite film will be described. In an unburned composite film forming step, an unburned composite film is formed using the varnish mentioned above. At this time, the unburned composite film may be formed directly on a substrate or on a lower layer film that is different from the unburned composite film. Furthermore, after the unburned composite film is formed using the above-mentioned varnish (composition for producing a porous film), an upper layer film that is different from the above-mentioned unburned composite film may be further formed in the upper layer. Note here that in this application, both the method for providing a lower layer film on the substrate, and the method for further forming an upper layer film that is different from the above-mentioned unburned composite film by using the above-mentioned varnish after the unburned composite film is formed, are included in the method for forming an unburned composite film on the substrate. However, when the resin component contained in the above-mentioned varnish is a polyamide acid or a polyamide-imide precursor, and when a material that does not need a burning step is used for the upper layer film, an upper layer film may be formed on the resin-fine particle composite film after burning may be formed. The unburned composite film can be formed by, for example, applying the above-mentioned varnish onto the substrate or the lower layer film, and drying thereof at normal pressure or under vacuum at 0 to 100° C., and preferably at normal pressure at 10 to 100° C. Examples of the substrate include a PET film, a SUS substrate, a glass substrate, and the like.

Examples of the lower layer film (or upper layer film) include a lower (or upper) layer unburned composite film formed using a varnish for forming a lower layer film (or upper layer film) containing a resin including polyamide acid, polyimide, a polyamide-imide precursor, polyamide-imide and polyethersulfone, fine particles, and a solvent, wherein the content of the fine particles is more than 40% by volume and not more than 81% by volume with respect to the total of the resin and the fine particles. The lower layer unburned composite film may be formed on the substrate. When the content of the fine particles is more than 40% by volume, the particles are uniformly dispersed; and when the content of the fine particles is not more than 81% by volume, the particles are dispersed without causing aggregation of particles. Consequently, pores can be formed uniformly in the porous film. Furthermore, when the content of the fine particles is within the above-mentioned range, when the lower layer unburned composite film is formed on the substrate, even when the substrate is not provided with a mold release layer in advance, mold releasability after film formation can be easily secured.

Note here that the fine particles to be used for the varnish for forming a lower (or upper) layer film and the fine particles to be used for the above-mentioned varnish may be the same as or different from each other. In order to increase the density of pores in the lower (or upper) layer unburned composite film, it is preferable that the fine particles to be used for the varnish for forming a lower (or upper) layer film has a particle diameter distribution index that is equal to or smaller than that of the fine particles to be used for the above-mentioned varnish. Alternatively, it is preferable that the fine particles to be used for the varnish for a lower (or upper) layer film have a sphericity that is equal to or smaller than that of the fine particles to be used for the above-mentioned varnish.

Furthermore, the average particle diameter of the fine particles to be used for the varnish for forming a lower (or upper) layer film is preferably 5 to 1000 nm, and more preferably 10 to 600 nm.

Furthermore, the content of the fine particles to be used for the varnish for forming a lower (or upper) layer film may be larger or smaller than that of the above-mentioned varnish. Suitable examples of the components such as a resin component, fine particles, and a solvent included in the varnish for forming a lower (or upper) layer film are the same as those in the above-mentioned varnish. The varnish for forming a lower (or upper) layer film can be prepared by the same method as that of the above-mentioned varnish. The lower layer unburned composite film can be formed by, for example, applying the varnish for a lower layer film onto the substrate, followed by drying at normal pressure or under vacuum at 0 to 100° C., and preferably at normal pressure at 10 to 100° C. The same is true to the film formation conditions of the upper layer unburned composite film.

Furthermore, examples of the lower (or upper) layer film include films made of fiber materials such as cellulose resin, non-woven fabric (for example, polyimide non-woven fabric or the like (a fiber diameter is, for example, about 50 nm to about 3000 nm)), a polyimide film, and the like.

Furthermore, a burning step of burning the unburned composite film or a laminated film of the unburned composite film and the lower (or upper) layer film so as to obtain a resin-fine particle composite film is carried out. When the unburned composite film or the lower layer unburned composite film is formed on the substrate, burning may be carried out as it is, or the unburned composite film or the laminated film of the unburned composite film and the lower layer film may be peeled off from the substrate before carrying out the burning step.

Note here that when the above-mentioned lower (or upper) layer film is a lower (or upper) layer unburned composite film formed using a varnish for forming a lower (or upper) layer film, and the composition of the varnish for forming a lower (or upper) layer film is the same as the composition of the varnish to be used for formation of the above-mentioned unburned composite film, the laminated film of the above-mentioned unburned composite film and the above-mentioned lower (or upper) layer film are substantially one layer (single layer).

When the unburned composite film or the laminated film of the unburned composite film and the lower (or upper) layer unburned composite film is peeled from the substrate, the substrate provided with a mold release layer in advance can also be used in order to further enhance the releasability of the film. In a case of providing a mold release layer in the substrate in advance, the mold release agent is applied onto the substrate and is dried or baked before the application of the composition for producing a porous film. The mold release agent used here may be a known mold release agent, such as an alkylphosphate ammonium salt-based or fluorine-based agent or silicon, without particular restrictions. When the dried unburned composite film is peeled from the substrate, a slight amount of the mold release agent remains on the surface of the peeled unburned composite film and may lead to discoloration during burning and adverse effects on the electrical characteristics, and the mold release agent should therefore be removed as much as possible. In order to remove the mold release agent, a washing step of washing the unburned composite film or the laminated film of the unburned composite film and the lower layer unburned composite film peeled from the substrate with an organic solvent may be introduced.

Alternatively, when the substrate is directly used, as it is, without providing a mold release layer in formation of the unburned composite film or the lower layer unburned composite film, the step of forming the mold release layer and the washing step can be omitted. Furthermore, in the method for manufacturing an unburned composite film, before the below-mentioned burning step, an immersion step into a water-containing solvent, a pressing step, and a drying step after the immersion step may be optionally provided.

[Production of Resin-Fine Particle Composite Film (Burning Step)]

When a resin component contained in a varnish is polyamide acid or a polyamide-imide precursor, the unburned composite film is subjected to heat treatment as post-treatment (burning) to be formed into a composite film (resin-fine particle composite film) composed of resin made of polyimide and/or polyamide-imide and fine particles. Note here that when the resin component contained in a varnish is polyimide, polyamide-imide or polyethersulfone, a burning step may not be carried out. In the unburned composite film forming step, when the unburned composite film is formed on a lower layer film that is different from the unburned composite film, the lower layer film together with the unburned composite film is burned in the burning step. The burning temperature in the burning step varies depending on the structures of the unburned composite film and the lower layer film and the presence or absence of a condensing agent, but the temperature is preferably 120° C. to 450° C., and more preferably 150° C. to 400° C. In a case of using an organic material for the fine particles, the burning temperature need to be set to a temperature lower than the thermal decomposition temperature of the organic material. When the resin component contained in the varnish is polyamide acid, in the burning step, imidization is preferably completed.

The burning can be performed by, for example, a method of increasing the temperature from room temperature to 400° C. over three hours and then holding 400° C. for 20 minutes or a method of stepwise drying-thermal imidization by stepwise increasing the temperature by 50° C. from room temperature to 400° C. (holding the temperature of each step for 20 minutes) and finally holding 400° C. for 20 minutes. When the unburned composite film is formed on the substrate and the unburned composite film is peeled from the substrate once, an end of the unburned composite film may be fixed to, for example, a frame made of SUS stainless steel to prevent deformation.

The thickness of the resulting resin-fine particle composite film can be determined by, for example, measuring the thicknesses of a plurality of positions with a micrometer or the like and averaging the thicknesses. Preferred average thickness varies depending on the application of use of porous film, however, is preferably 5 to 500 µm and more preferably 10 to 100 µm, and further preferably 15 to 30 µm, for example, in the use as a separator or the like. The average thickness is preferably 5 to 500 µm and more preferably 10 to 300 µm, and further preferably 20 to 150 µm in the use as a filter or the like.

[Porosification of Resin-Fine Particle Composite Film (Fine Particle-Removing Step)]

The porous film can be produced with high reproducibility by selecting an appropriate method for removing the fine particles from the resin-fine particle composite film.

For example, when silica is employed as the material of the fine particles, the silica can be removed by treating the resin-fine particle composite film with, for example, a low-concentration hydrogen fluoride solution to dissolve the silica.

Alternatively, an organic material can also be selected as the material of the fine particles. Any organic material, which is decomposed at a temperature lower than resin contained in the resin-fine particle composite film, may be used without particular limitation. Examples of the fine particles include resin fine particulates composed of linear polymers and known depolymerizable polymers. The linear polymer usually has a molecular chain that is randomly cleaved during thermal decomposition; and the depolymerizable polymer is decomposed into a monomer during thermal decomposition. Both of them are decomposed into a low molecular weight substance or to $CO_2$ and disappear from the resin-fine particle composite film. A decomposition temperature of the resin fine particles to be used is preferably 200° C. to 320° C. and more preferably 230° C. to 260° C. A decomposition temperature of 200° C. or more allows formation of a film even if the composition for producing a porous film contains a high boiling point solvent and broadens the selection of burning conditions of the polyimide. Furthermore, a decomposition temperature of lower than 320° C. allows the resin fine particles alone to disappear without thermally damaging the polyimide.

The total thickness of the porous film is not particularly limited, and is preferably 5 μm to 500 μm, more preferably 10 μm to 100 μm, and further preferably 15 μm to 30 μm, when, for example, the porous film is used for a separator or the like. The thickness is preferably 5 μm to 500 μm, more preferably 10 μm to 30 μm, and further preferably 20 μm to 150 μm, when, for example, the porous film is used for a filter or the like. Similar to the measurement of the resin-fine particle composite film, the above-mentioned thickness can be determined by, for example, measuring thicknesses of a plurality of positions with a micrometer or the like and averaging the thicknesses.

When the porous film is formed of two or more types of compositions for producing a porous film, or when it is manufactured by combination with a layer by the other composition for producing a porous film by a preparation method that is different from the manufacturing method of the present invention, the ratio in the thickness direction of the region formed by each composition for producing a porous film may be appropriately determined depending on the application of use of the porous film. When a porous film has two regions, that is, a layer (I) by composition for producing a porous film according to the present invention and a layer (II) by the other composition for producing a porous film that is different from the manufacturing method according to the present invention, the ratio ((I):(II)) of each region in the thickness direction may be adjusted to, for example, 1:99 to 99:1, preferably 5:95 to 95:5. The thickness of each layer can be calculated by averaging thicknesses at a plurality of positions in a cross section of the porous polyimide film by observing under, for example, a scanning electron microscope (SEM).

[Resin-Removing Step]

A method for manufacturing a porous film may include a resin-removing step of removing at least a part of a resin portion of a resin-fine particle composite film before the fine particle-removing step, or removing at least a part of the porous film after the fine particle-removing step. When at least a part of the resin-fine particle composite film is removed before the fine particle-removing step and when the fine particles are removed and pores are formed in the subsequent fine particle-removing step, the aperture rate of the porous film of the final product can be improved as compared with the case where at least a part of the resin portion is not removed. Furthermore, when at least a part of the porous film is removed after the fine particle-removing step, the aperture rate of the porous film of the final product can be improved as compared with the case where at least a part of the porous film is not removed.

The step of removing at least a part of the resin portion or the step of removing at least a part of the porous film can be carried out by a usual chemical etching or physical removing method, or a method combining these methods.

The chemical etching method includes treatment using a chemical etchant such as an inorganic alkaline solution or an organic alkaline solution. An inorganic alkaline solution is preferable. Examples of the inorganic alkaline solution include a hydrazine solution including hydrazine hydrate and ethylenediamine; a solution of alkaline metal hydroxide such as potassium hydroxide, sodium hydroxide, sodium carbonate, sodium silicate, and sodium metasilicate; an ammonium solution; an etchant including alkali hydroxide, hydrazine, and 1,3-dimethyl-2-imidazolidinone as a main component, or the like. Examples of the organic alkaline solution include an alkaline solution of primary amines such as ethyl amine and n-propyl amine; secondary amines such as diethyl amine and di-n-butylamine; tertiary amines such as triethylamine and methyl diethyl amine; alcohol amines such as dimethyl ethanol amine and triethanolamine; quaternary ammonium salts such as tetramethylammonium hydroxide and tetraethylammonium hydroxide; cyclic amines such as pyrrole and piperidine, or the like.

As a solvent for each solution, pure water and alcohols can be appropriately selected. Furthermore, solvents in which an appropriate amount of surfactant is added can be used. An alkali concentration is, for example, 0.01 to 20% by mass.

Furthermore, examples of the physical method include dry etching by plasma (oxygen, argon, etc.), corona discharge, or the like, a method for treating a surface of a film by dispersing abrasives (for example, alumina (rigidity 9), or the like) in a liquid and irradiating the surface of a film with the liquid at the irradiation rate of 30 to 100 m/s, and the like.

The above-mentioned methods are preferable because they are applicable in the resin-removing step both before and after the fine particle-removing step.

On the other hand, as the physical method that can be applied only to the resin-removing step carried out after the fine particle-removing step, a method of compression bonding a mount film (for example, a polyester film such as a PET film) whose subject surface is wetted with liquid and then peeling a porous film from the mount film after drying or without drying can be employed. Due to the surface tension of the liquid or electrostatic adhesion, the porous film is peeled from the mount film with only the surface layer of the porous film left on the mount film.

The present invention will now be more specifically described with reference to Examples, but the scope of the present invention is not limited to these Examples.

Example 1

Figure 1:
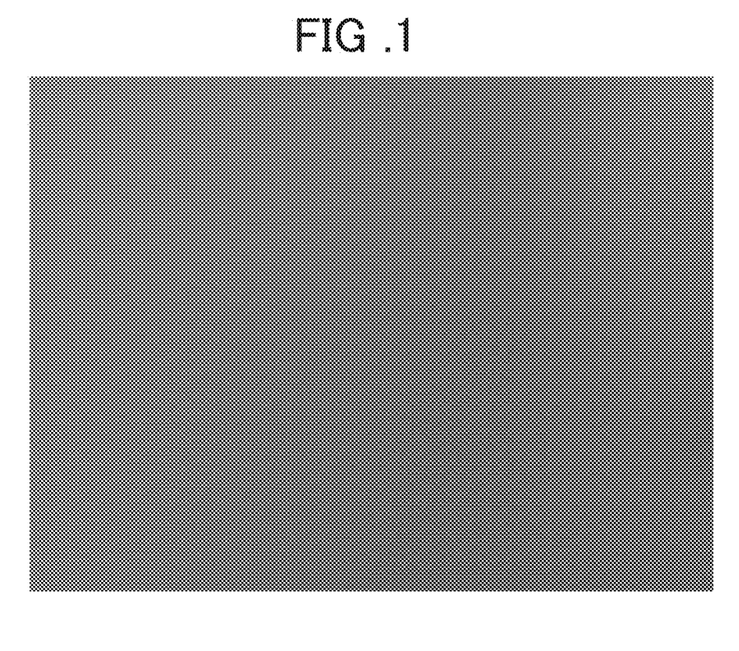
FIG. 1 is a scanning electron microscope image of a coating film formed by using a composition for producing a porous film prepared in Example 1.

Slurry (3-a) including the following components was dispersed in a three-roll mill, and then dimethyl acetamide and gamma butyrolactone were added thereto so that the solid content concentration became 30% by mass (the mass ratio of dimethyl acetamide to gamma butyrolactone in the final solvent composition was 90:10). Thus, a composition for producing a porous film was prepared. The composition for producing a porous film was applied onto a substrate, followed by heating at 90° C. for 300 seconds to remove a solvent. Thus, a coating film having a thickness of about 40 μm was formed. The surface of the formed coating film was observed under a scanning electron microscope (SEM). The obtained SEM image is shown in FIG. 1.

<Components of Slurry (3-a)>
Resin: 30 parts by mass (a solid content amount of polyamide acid) of polyamide acid (20% by mass solution of dimethyl acetamide)
Fine particles: 70 parts by mass of silica (average particle diameter: 150 nm) (including 0.5% by mass dispersant with respect to silica)

Comparative Example 1

Figure 2A:
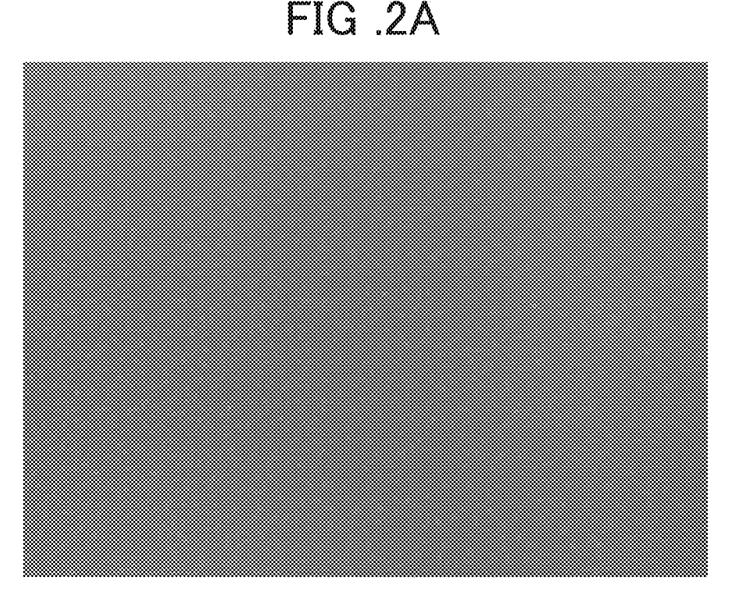
FIG. 2(a) is a scanning electron microscope image of a coating film formed by using a composition for producing a porous film prepared in Comparative Example 1.
Figure 2B:
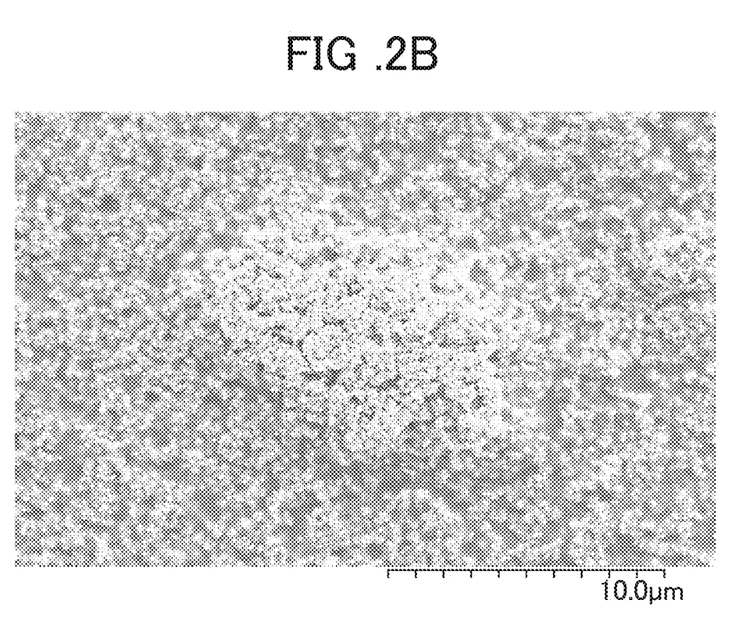
FIG. 2(b) is a scanning electron microscope image of the same coating film with different magnification.

Slurry (1-a) including the following components and a varnish (1-a) whose concentration of polyamide acid was 14.3% by mass were dispersed and kneaded in a rotation-revolution type mixer (product name: "Awatori Rentarou" manufactured by Thinky Corporation) while dimethyl acetamide and gamma butyrolactone were added thereto so that the solid content concentration of the final composition became 30% by mass (the mass ratio of dimethyl acetamide to gamma butyrolactone in the final solvent composition was 90:10) to prepare a composition for producing a porous film (the mass ratio of polyamide acid to silica in the final composition was 30:70). The composition for producing a porous film was applied onto a substrate, followed by heating at 90° C. for 300 seconds to remove a solvent. Thus, a coating film was formed. The surface of the formed coating film was observed under a scanning electron microscope (SEM). The obtained SEM images are shown in FIG. 2(a) and FIG. 2(b). The image of FIG. 2(b) is an observation image shown at higher magnification than in FIG. 2(a).
<Component of Slurry (1-a)>
Solvent: 50 parts by mass of dimethyl acetamide
Fine particles: 50 parts by mass of silica (average particle diameter: 150 nm) (including 0.5% by mass dispersant with respect to silica)
<Component of Varnish (1-a)>
Resin: polyamide acid (20 mass % solution of dimethyl acetamide)
Solvent: dimethyl acetamide Example 2

A composition for producing a porous film was prepared by dispersing and kneading in the same manner as in Comparative Example 1 (the mass ratio of polyamide acid to silica in the final composition was 30:70), and then treated using a beads mill (zirconia beads: 0.3 mm, peripheral velocity 11, one hour) ("PICO MILL" available from Asada Iron Works Co., Ltd.) to obtain a composition for producing a porous film. The obtained composition was applied onto a substrate, followed by heating at 90° C. for 300 seconds to remove a solvent. Thus, a coating film was formed. Observation under SEM showed that an excellent coating film similar to that of Example 1 was obtained.

It is shown from FIG. 1 that in a composition for producing a porous film prepared using a three-roll mill that carries out dispersion by a shearing force and a compression force, or a beads mill that carries out dispersion by a shearing force and an impact force, silica fine particles having a small average particle diameter of 150 nm can be dispersed uniformly. On the contrary, it is shown from FIGS. 2(a) and (b) that a composition for producing a porous film prepared using a rotation-revolution type mixer that carries out dispersion by a centrifugal force, aggregation of silica fine particles are partially observed.
[Burning Step]
In Examples 1 and 2 in which an excellent coating film (unburned composite film) was obtained, heat treatment (burning) was carried out at 380° C. for 15 minutes for imidization so as to obtain a resin-fine particle composite film.
[Fine Particle Removing Step]
Each of the obtained resin-fine particle composite films was immersed in 10% HF solution for 10 minutes to remove fine particles included in a film. After removal of fine particles, washing with water and drying were carried out, a porous film was obtained. When the obtained film was observed under a SEM, the porous film in Example 2 had a higher aperture rate of the surface.
(Air Permeability)
Porous polyimide films obtained in Examples 1 and 2 were cut into 5 cm square of samples for measurement of air permeability. Time for 100 ml of air passing through each of the samples was measured using a Gurley densometer (manufactured by Toyo Seiki Co., Ltd.) in accordance with JIS P 8117. As a result, it was demonstrated that the time of Example 2 was faster than that in Example 1 by about 100 seconds. It is considered that since a composition for producing a porous film having a more excellent dispersion state was obtained, permeability of a porous film became higher in Example 2.

Liquid permeation property of each of water, propylene glycol monomethyl ether acetate, isopropanol, and a photoresist composition to the porous film obtained in Example 2 was evaluated at a filtering pressure of 0.1 MPa or 0.08 MPa. Note here that the evaluation of the liquid permeation property was carried out by allowing a test sample liquid to pass through the surface of a housed and set circular porous, film having a diameter of 47 mm. Evaluation results of the liquid permeation property are shown in Table 1.

TABLE 1

| | Flow rate (ml/minute) | |
| --- | --- | --- |
| | Filtration pressure 0.1 MPa | Filtration pressure 0.08 MPa |
| Water | 5.5 | 5.0 |
| Propylene glycol monomethyl ether acetate | 3.0 | 2.2 |
| Isopropanol | 2.1 | 2.0 |
| Photoresist composition | 1.6 | 1.2 |

<Method for Producing Porous Film Using Two Types of Compositions for Producing Porous Films Having Fine Particles Having Different Average Particle Diameters>
   Composition 1 for producing a porous film for a lower layer film was prepared in the same manner as in Example 2.
   Composition 1 for producing a porous film for an upper layer film was prepared by the following Reference Example 1.
   Composition 2 for producing a porous film for an upper layer film was prepared by the following Reference Example 2.

Reference Example 1

Slurry (1-a) including the following components and a varnish (1-b) whose concentration of polyamide acid was 14.3% by mass were dispersed and kneaded in a rotation-revolution type mixer (product name: "Awatori Rentarou" manufactured by Thinky Corporation) while dimethyl acetamide and gamma butyrolactone were added thereto so that the solid content concentration of the final composition became 30% by mass (the mass ratio of dimethyl acetamide to gamma butyrolactone in the final solvent composition was 90:10) to prepare a composition for producing a porous film (the mass ratio of polyamide acid to silica in the final composition was 30:70 (approximate volume ratio was 40:60)).

<Component of Slurry (1-a)>
Solvent: 50 parts by mass of dimethyl acetamide
Fine particles: 50 parts by mass of silica (average particle diameter: 700 nm) (including 0.5% by mass dispersant with respect to silica)
<Component of Varnish (1-b)>
Resin: polyamide acid (20 mass % solution of dimethyl acetamide)
Solvent: dimethyl acetamide Reference Example 2

A composition for producing a porous film was prepared in the same manner as in Reference Example 1 except that the mass ratio of polyamide acid to silica was 20:80 (approximate volume ratio was 28:72) in the final composition.
Manufacture of porous film Example 3

A composition 1 for producing a porous film for a lower layer film was applied onto a PET film using an applicator to form a lower layer film having a thickness of about 2 μm. Subsequently, the composition 1 for producing a porous film for an upper layer film was applied onto the above-mentioned lower layer film to form a film, and the film was subjected to pre-baking at 90° C. for 5 minutes to obtain an unburned composite film composed of the lower layer film and the upper layer film including fine particles having different average particle diameters and having a thickness of about 25 μm. The unburned composite film was immersed in water for three minutes, and then pressed by allowing the unburned composite film to pass through between two rollers. At this time, pressing pressure of the roller was 3.0 kg/cm², roller temperature was 80° C., the movement speed of the unburned composite film was 0.5 m/min. The unburned composite film peeled off from the base body, which had undergone pressing treatment, was subjected to heat treatment at 400° C. for 15 min to form a polyimide-fine particle composite film having a thickness of about 25 μm. Then, the polyimide-fine particle composite film was immersed in 10% HF solution for 10 minutes to remove fine particles included in the film, followed by washing with water and drying. Thus, a porous film composed of the lower layer film and the upper layer film having different average pore diameters and having a thickness of about 25 μm was obtained. The air permeability measured in the same manner as mentioned above was 299 seconds.

Example 4

A porous film having a thickness of about 24 μm and composed of the lower layer film and the upper layer film having different average pore diameters was obtained in the same manner as in Example 3 except that the composition 1 for producing a porous film for lower layer film was changed to a composition 2 for producing a porous film for lower layer film. The air permeability measured in the same manner as mentioned above was 92 seconds.

Surfaces at a lower layer film side (PET film side) of the obtained film were observed under SEM. In any films, it was verified that one silica fine particle appears as one pore. Furthermore, a cross-section was also observed under SEM, it was confirmed that a region of the composition 1 for producing a porous film for a lower layer film and a region of the composition 1 or 2 for producing a porous film of the upper layer film were formed, respectively.

Example 5

Slurry (3-b) including the following components was dispersed in a three-roll mill. Then, while dimethyl acetamide was added so that the solid content concentration became 42% by mass, the slurry (3-b) was dispersed and kneaded twice in a rotation-revolution type mixer (product name: "Awatori Rentarou" manufactured by Thinky Corporation) to prepare a composition for producing a porous film. The composition for producing a porous film was applied onto a substrate, followed by heating at 90° C. for 300 seconds to remove a solvent. Thus, a coating film was formed.

<Component of Slurry (3-b)>
Resin: 57 parts by mass of polyethersulfone (35 mass % solution of dimethyl acetamide) (solid content amount of polyethersulfone: 20 parts by mass)
Fine particles: 80 parts by mass of silica (average particle diameter: 100 nm) (including 0.5% by mass dispersant with respect to silica)

The obtained coating film (resin-fine particle composite film) was immersed in 10% HF solution for 10 minutes to remove fine particles included in the film. After removal of fine particles, washing with water and drying were carried out to obtain a porous film having a thickness of about 40 μm. A surface of the obtained porous film was observed under a scanning electron microscope (SEM). The obtained SEM image is shown in FIG. 3. It is shown from FIG. 3 that in a porous film using the composition for producing a porous film of Example 5 prepared using a three-roll mill that carries out dispersion by a shearing force and a compression force, silica fine particles having such a small average particle diameter as 100 nm can be dispersed uniformly and pore formation was achieved.

Comparative Example 2

Slurry (1-c) obtained by kneading the following components by a homogenizer and varnish (1-d) obtained by kneading the following components by a rotation-revolution type mixer (product name: "Awatori Rentarou" manufactured by Thinky Corporation) were dispersed and kneaded by a rotation-revolution type mixer (product name: "Awatori Rentarou" manufactured by Thinky Corporation) while dimethyl acetamide and gamma butyrolactone were added thereto so that the solid content concentration in the final composition became 42% by mass to prepare a composition for producing a porous film (the mass ratio of polyethersulfone to silica in the final composition was 20:80).

<Component of Slurry (1-c)>
Solvent: 80 parts by mass of dimethyl acetamide
Fine particles: 80 parts by mass of silica (average particle diameter: 100 nm) (including 0.5% by mass dispersant with respect to silica)
<Component of Varnish (1-d)>
Resin: 67 parts by mass of polyethersulfone (dimethyl acetamide 30 mass % solution) (solid content amount of polyethersulfone was 20 parts by mass)

The composition for producing a porous film was applied onto a substrate, followed by heating at 90° C. for 300 seconds to remove a solvent to form a coating film. Then, a polyethersulfone porous film having a thickness of about 40 µm was obtained in the same manner as in Example 5. A surface of the formed porous film was observed under a scanning electron microscope (SEM). The obtained SEM image was shown in FIG. 4. It is shown from FIG. 4 that in the composition for producing a porous film prepared using a rotation-revolution type mixer that carries out dispersion by a centrifugal force, aggregation of silica fine particles is partially observed and ununiformity of the resin film that has been made porous was observed.

The invention claimed is:

1. A method for manufacturing a porous film, the method comprising:
    preparing a composition for producing a porous film containing fine particles, and at least one resin component selected from the group consisting of polyamide acid, polyimide, a polyamide-imide precursor, polyamide-imide and polyethersulfone,
    wherein said preparing comprises dispersing a slurry containing the fine particles by a shearing force and a compression or an impact force,
    wherein the slurry contains the at least one resin component selected from the group consisting of polyamide acid, polyimide, a polyamide-imide precursor, polyamide-imide and polyethersulfone, and
    wherein the porous film has a front surface and a rear surface, and pores communicating the front and rear surfaces with each other.

2. The method according to claim 1, wherein an average particle diameter of the fine particles is not more than 200 nm.

3. The method according to claim 1, wherein a content of the fine particles in the slurry is not less than 30% by mass and not more than 90% by mass with respect to a mass of the slurry.

4. The method according to claim 1, wherein the fine particles are inorganic fine particles.

5. The method according to claim 1, further comprising:
    forming an unburned composite film using the composition for producing a porous film,
    burning the unburned composite film to obtain a resin-fine particle composite film, and
    removing fine particles from the resin-fine particle composite film.

6. The method according to claim 1, wherein a film thickness of the porous film is 10 to 500 µm.

7. The method according to claim 1, wherein the step of dispersing the slurry by a shearing force and a compression or an impact force is carried out by dispersing the slurry using a three-roll mill.

8. The method according to claim 1, wherein the porous film has fluid permeability because of the pores communicating the front and rear surfaces with each other.

9. The method according to claim 8, wherein the fluid permeability is air permeability and/or liquid permeability.

10. The method according to claim 5, wherein the pores communicating the front and rear surfaces with each other are formed by the removing of the fine particles.

11. A method for manufacturing a composition for producing a porous film, the method comprising:
    preparing slurry (1) including fine particles and a solvent (1);
    preparing a varnish (1) including at least one resin component selected from the group consisting of polyamide acid, polyimide, a polyamide-imide precursor, polyamide-imide and polyethersulfone, and a solvent (2), wherein the solvent (2) may be a same solvent as the solvent (1) or a different solvent from the solvent (1);
    preparing slurry (2) by kneading the slurry (1) and the varnish (1),
    kneading the prepared slurry (2), and
    dispersing the kneaded slurry (2) by a shearing force and a compression or an impact force,
    wherein a content of the fine particles is not less than 30% by mass and not more than 90% by mass with respect to the slurry (2).

12. The method according to claim 11, wherein the step of dispersing the kneaded slurry (2) by a shearing force and a compression or an impact force is carried out by dispersing the kneaded slurry (2) using a three-roll mill.

* * * * *